US012561970B2

(12) United States Patent
Wang et al.

(10) Patent No.: US 12,561,970 B2
(45) Date of Patent: Feb. 24, 2026

(54) METHOD, DEVICE, AND COMPUTER PROGRAM PRODUCT FOR IMAGE RECOGNITION

(71) Applicant: EMC IP Holding Company LLC, Hopkinton, MA (US)

(72) Inventors: Zijia Wang, WeiFang (CN); Jiacheng Ni, Shanghai (CN); Zhen Jia, Shanghai (CN); Wenbin Yang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 985 days.

(21) Appl. No.: 17/405,241

(22) Filed: Aug. 18, 2021

(65) Prior Publication Data

US 2023/0038047 A1     Feb. 9, 2023

(30) Foreign Application Priority Data

Jul. 23, 2021    (CN) ......................... 202110839122.X

(51) Int. Cl.
*G06V 20/00* (2022.01)
*G06F 18/214* (2023.01)
(Continued)

(52) U.S. Cl.
CPC ............ *G06V 20/00* (2022.01); *G06F 18/214* (2023.01); *G06N 7/01* (2023.01); *G06V 20/80* (2022.01)

(58) Field of Classification Search
CPC .......... G06V 20/00; G06V 20/80; G06N 7/01; G06F 18/214
See application file for complete search history.

(56) References Cited

U.S. PATENT DOCUMENTS 10,560,530 B2 * 2/2020 Karjee .................... H04L 12/66
2016/0078359 A1 * 3/2016 Csurka ................ G06V 10/776
706/12
(Continued)

FOREIGN PATENT DOCUMENTS

CN      110929624 A   *  3/2020  ....... G06F 18/24323
CN      112633425 A   *  4/2021  ........... G06K 9/6256
EP        2172874 A1   *  4/2010  .............. G06K 9/52

OTHER PUBLICATIONS

J. Han et al., "Deep Self-Learning From Noisy Labels," IEEE International Conference on Computer Vision, 2019, 10 pages.
(Continued)

*Primary Examiner* — Matthew Ell
*Assistant Examiner* — Ishan Moundi
(74) *Attorney, Agent, or Firm* — Ryan, Mason & Lewis, LLP

(57) ABSTRACT

Embodiments of the present disclosure relate to a method, a device, and a computer program product for image recognition. In some embodiments, characterization information for a first reference image in a reference image set is generated in an image recognition engine by using a Gaussian mixture model. First reference label information for the first reference image is generated based on the characterization information for the first reference image, the first reference label information being associated with a category of a first object in the first reference image. The image recognition engine is updated by determining the accuracy of the first reference label information for the first reference image. In this way, good characterization of images and generation of reference label information for the images can be achieved, thus both improving the robustness of the generated reference label information and significantly improving the accuracy of image recognition.

20 Claims, 4 Drawing Sheets

(51) Int. Cl.
 G06N 7/01 (2023.01)
 G06V 20/80 (2022.01)

(56) References Cited

U.S. PATENT DOCUMENTS

| | | | | |
|---|---|---|---|---|
| 2017/0039714 A1* | 2/2017 | Small | ......................... | G06T 5/50 |
| 2023/0162359 A1* | 5/2023 | Choi | ...................... | G16H 50/20 |
| | | | | 382/128 |

OTHER PUBLICATIONS

S. Mukherjee et al., "Uncertainty-aware Self-training for Few-shot Text Classification," 34th Conference on Neural Information Processing Systems, 2020, 14 pages.
D. T. Nguyen et al., "SELF: Learning to Filter Noisy Labels with Self-Ensembling," arXiv:1910.01842v1, Oct. 4, 2019, 15 pages.
Wikipedia, "Mixture Model," https://en.wikipedia.org/wiki/Mixture_model, Jul. 14, 2021, 15 pages.
Wikipedia, "Expectation-maximization Algorithm," https://en.wikipedia.org/wiki/Expectation%E2%80%93maximization_algorithm, Aug. 15, 2021, 14 pages.

* cited by examiner

300

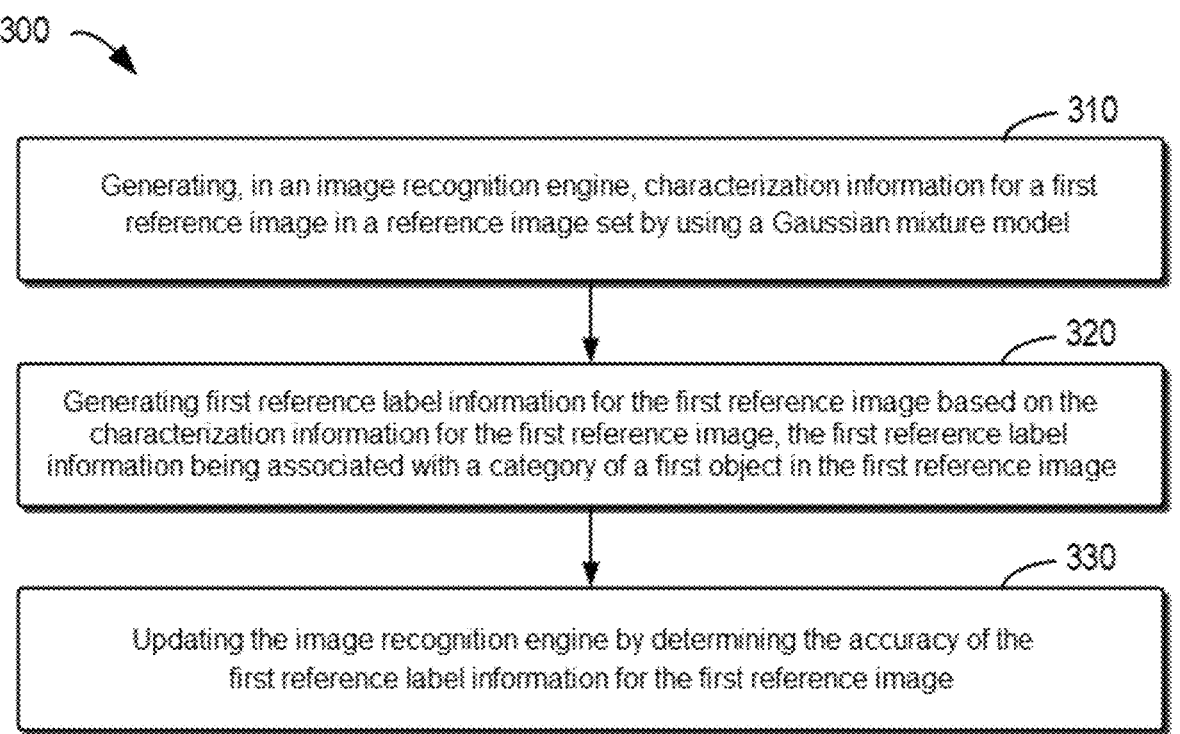

310

Generating, in an image recognition engine, characterization information for a first reference image in a reference image set by using a Gaussian mixture model

320

Generating first reference label information for the first reference image based on the characterization information for the first reference image, the first reference label information being associated with a category of a first object in the first reference image

330

Updating the image recognition engine by determining the accuracy of the first reference label information for the first reference image

METHOD, DEVICE, AND COMPUTER PROGRAM PRODUCT FOR IMAGE RECOGNITION

RELATED APPLICATION(S)

The present application claims priority to Chinese Patent Application No. 202110839122.X, filed Jul. 23, 2021, and entitled "Method, Device, and Computer Program Product for Image Recognition," which is incorporated by reference herein in its entirety.

FIELD

Embodiments of the present disclosure relate to the field of information processing and, more specifically, to a method, a device, and a computer program product for image recognition.

BACKGROUND

In recent years, deep neural networks have played a crucial role in numerous fields. There is an increasingly high demand for data in order to achieve better performance. For most fields such as agriculture, data with reference label information is difficult to obtain.

In applications of some fields (such as some applications using Bidirectional Encoder Representations from Transformers (BERT) and generative pre-training (GPT) models), a large amount of data without reference label information is directly used for model pre-processing.

Generally, this method cannot lead to the desired performance and cannot be commonly applied in other fields. To alleviate the burden caused by data requirements, various methods such as domain adaptation and self-training have been proposed. In recent years, self-training methods have been widely used due to their outstanding performance. In self-training methods, good characterization of reference label information is a key factor for performance gain, so how to improve the generation of reference label information is still an urgent problem to be solved.

SUMMARY

Generally, embodiments of the present disclosure provide a method, a device, and a computer program product for image recognition.

In a first aspect, embodiments of the present disclosure provide a method for image recognition. In the method, characterization information for a first reference image in a reference image set is generated in an image recognition engine by using a Gaussian mixture model. First reference label information for the first reference image is generated based on the characterization information for the first reference image, the first reference label information being associated with a category of a first object in the first reference image. The image recognition engine is updated by determining the accuracy of the first reference label information for the first reference image.

In a second aspect, the embodiments of the present disclosure provide a device for image recognition. The device includes a processor and a memory storing computer-executable instructions. The computer-executable instructions, when executed by the processor, cause the device to perform actions including: generating, in an image recognition engine, characterization information for a first reference image in a reference image set by using a Gaussian mixture model; generating first reference label information for the first reference image based on the characterization information for the first reference image, the first reference label information being associated with a category of a first object in the first reference image; and updating the image recognition engine by determining the accuracy of the first reference label information for the first reference image.

In a third aspect, the embodiments of the present disclosure provide a computer program product. The computer program product is tangibly stored on a non-transitory computer-readable medium and includes machine-executable instructions. The machine-executable instructions, when executed, cause a machine to perform the method according to the first aspect.

It should be understood that the content described in this Summary is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, the same or similar accompanying numerals indicate the same or similar elements, wherein

FIG. 3 illustrates a flow chart of a method for image recognition according to some example embodiments of the present disclosure;

In all of the accompanying drawings, the same or similar reference numerals indicate the same or similar elements.

DETAILED DESCRIPTION

Figure 1:
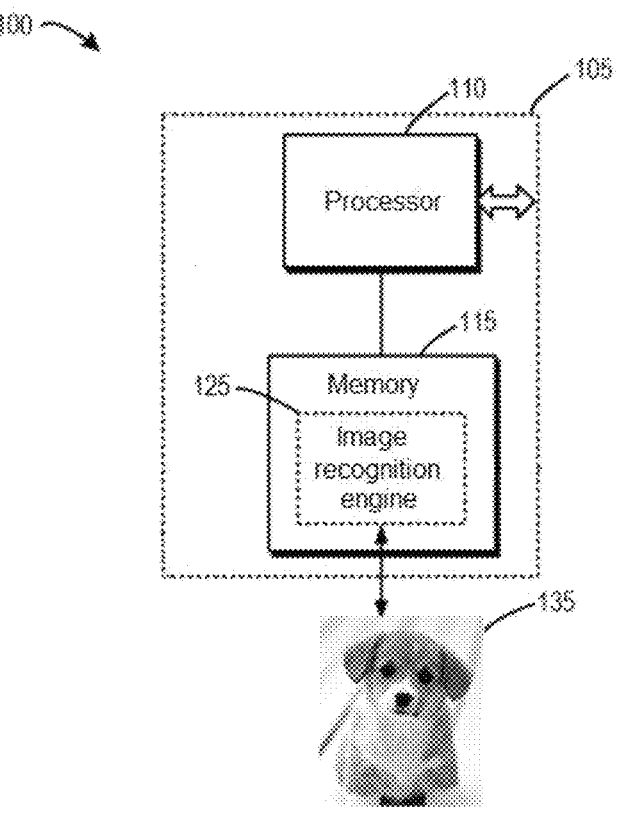
FIG. 1 illustrates an example environment in which embodiments of the present disclosure can be implemented.

Principles of the present disclosure will be described below with reference to several example embodiments shown in the accompanying drawings. It should be understood that these specific embodiments are described only for the purpose of enabling a person skilled in the art to better understand and then implement the present disclosure, rather than limiting the scope of the present disclosure in any way.

As used herein, the term "include" and similar terms thereof should be understood as open-ended inclusion, i.e., "including but not limited to" The term "based on" should be understood as "based at least in part on." The term "an embodiment" or "the embodiment" should be construed as "at least one embodiment." The terms "first," "second," and the like may refer to different or identical objects. Other explicit and implicit definitions may be included below.

As used herein, the term "determine" encompasses a variety of actions. For example, "determine" may include computing, calculating, processing, exporting, investigating, looking up (e.g., looking up in a table, an image database, or another image data structure), identifying, and the like. In addition, "determine" may include receiving (e.g., receiving information), accessing (e.g., accessing image data in a memory), and the like. In addition, "determine" may include parsing, selecting, choosing, establishing, and the like.

The term "neural network" as used herein can be understood as a machine learning model.

The model is capable of learning a correlation between corresponding inputs and outputs from training image data, and then processing given inputs after training to generate corresponding outputs based on a set of parameter values obtained from the training. A "neural network" can also be referred to as a "neural network model," "learning network," "learning model," "network," or "model." These terms are used interchangeably throughout this document.

Machine learning can be divided into three phases, namely, a training phase, a testing phase, and an application phase (also referred to as an inference phase). In the training phase, a given learning model can be trained using a large amount of training image data, and values of a parameter set of the model can be continuously iterated and updated until the model can achieve a desired goal. After training, the values of the parameter set of the machine learning model are determined. In the testing phase, the trained learning model can be tested by using test samples to determine the performance of the learning model. In the application phase, actual input image data can be applied to the trained learning model. The learning model can process the actual input image data based on the parameter set obtained from training to provide a corresponding output.

As mentioned above, self-training methods have been widely used in recent years due to their outstanding performance. Self-training methods are a type of semi-supervised learning in which the basic idea is to train a student model using a teacher model. In a self-training method, a model trained based on a data set with reference label information is used to generate reference label (also referred to as pseudo-label) information for a data set without pre-existing label information, and then the model is retrained using a data set with reference label information and a data set with pre-existing label information.

However, there are many problems in a bootstrap process in the self-training method, one of which is the noise in the reference label information data. This problem can be considered as learning from noisy labels, and it has been proposed that reference label information can be optimized by sample selection or label smoothing, but these methods have failed to bring outstanding performance gains. However, the inventors note that no attention has been paid to data attributes in previous studies. In recent years, one new direction for knowledge extraction is to extract large data sets into small data sets, that is, it is desirable to find in a feature space some characterization approaches that can capture data attributes, and these characterization approaches may include those based on the basis of data. The basis of data can be broadly understood as a form of representation used to characterize data in multiple dimensions. The basis of data can be used to implement a potential representation of data in a probabilistic manner using an expectation maximization (EM) algorithm.

EM algorithms are solutions that use likelihood maximization algorithms to find hidden variable models, and the commonly used Gaussian mixture model (GMM) is an EM algorithm with specific constraints. An EM algorithm usually includes two steps, which are abbreviated as step E and step M, as shown below. A hidden variable model using a GMM can capture the uncertainty information considering data attributes. In the GMM, data can be represented in the form of distribution as follows:

$$p(\bar{x_n}) = \Sigma_{k=1}^{K} z_{nk} \mathbb{N}(x_n|\mu_k, \Sigma_k) \tag{1}$$

where characterization information $\bar{x_n}$ is considered as a linear superposition of K sub-Gaussian models $\mathbb{N}(x_n|\mu_k, \Sigma_k)$ (also referred to as Gaussian bases, or bases), K is the number of the bases, and $z_{nk}$ indicates the weight of the kth sub-Gaussian model in that linear combination. In the GMM, $z_{nk}$ can be updated in step E as follows:

$$z_{nk}^{new} = \frac{\mathbb{N}\left(\mu_k^{new}, \sum_k\right)}{\sum_{j=1}^{K} \mathbb{N}\left(\mu_j^{new}, \sum_j\right)} \tag{2}$$

Following that, parameter expectation pie, and variance Ekew in the GMM are updated in step M as follows:

$$\mu_k^{new} = \frac{1}{N_k} \sum_{n=1}^{N} z_{nk}^{new} \hat{x}_n \tag{3}$$

$$\sum_k^{new} = \frac{1}{N_k} \sum_{n=1}^{N} z_{nk}^{new} \left(\hat{x}_n - \mu_k^{old}\right)\left(\hat{x}_n - \mu_k^{old}\right)^T \tag{4}$$

where $N_k = \Sigma_{n=1}^{N} z_{nk}^{new}$. In this way, characterization of data using a GMM can be achieved.

The present disclosure provides an improved solution for image recognition. In this solution, a new method for generating soft reference label information based on basis transformation is provided. Centroids can be used as the initialization of bases, and the bases can be learned from image data with label information using orthogonal regularization. Then, basis labels can be converted to real hard labels to iteratively update the model and the bases.

According to this solution, it is possible to implement, in an image recognition engine, characterization of a reference image in a training image set using a Gaussian mixture model. Weight information for the Gaussian mixture model is generated based on the reference image and initial expectation information for the Gaussian mixture model, and characterization information for the reference image is generated based on this initial expectation information and the weight information. Label information for the reference image is generated based on the characterization information for the reference image, this label information being associated with a category of an object in the reference image. The image recognition engine is updated by determining the accuracy of the label information for the reference image.

With the solution of the present disclosure, by generating characterization information for an image using a Gaussian mixture model and by generating reference label information for the image using an EM algorithm, the robustness and interpretability of the generated reference label information can be improved, and the accuracy of image recognition can be significantly improved.

The principles and example implementations of the present disclosure will be described in detail below with reference to the accompanying drawings.

Referring first to FIG. 1, FIG. 1 illustrates an example environment in which embodiments of the present disclosure can be implemented. Environment 100 includes electronic device 105, and electronic device 105 includes processor 110 and memory 115 coupled to processor 110.

Memory 115 stores a program (or program instructions or code) that, when executed by processor 110, causes electronic device 105 to perform corresponding operations.

Electronic device 105 can be implemented by any suitable device having computing power.

Electronic device 105 may be a variety of terminal devices, such as a user terminal and a service terminal, including, for example, a mobile phone, a station, a tablet computer, a laptop computer, a desktop computer, a personal digital assistant (PDA), a navigation device, an audio and video player, a digital camera, a smart wearable device, and the like.

It should be understood that components, assemblies, modules, or units in electronic device 105 are shown for illustrative purposes only and do not imply any limitations. If desired, electronic device 105 may include any other suitable components, assemblies, modules, or units.

As shown, memory 115 stores image recognition engine 125 that can recognize image 135. In this example, image recognition engine 125 is implemented by program code or instructions executable by processor 110. Image recognition engine 125 can also be implemented in other ways. For example, in some example embodiments, image recognition engine 125 can be implemented, for example, in hardware or dedicated circuits, software, logic, or any combination thereof. In some other example embodiments, some aspects of image recognition engine 125 can be implemented in hardware, and other aspects of image recognition engine 125 can be implemented in firmware or software executable by a controller, microprocessor, or other computing devices.

In various example embodiments of the present disclosure, image recognition engine 125 is configured to generate characterization information for a first reference image in a reference image set using a Gaussian mixture model. Moreover, image recognition engine 125 is configured to generate first reference label information for the first reference image based on the characterization information for the first reference image, the first reference label information being associated with a category of a first object in the first reference image. Image recognition engine 125 is configured to update itself by determining the accuracy of the first reference label information for the first reference image. In this manner, good characterization of an image and generation of reference label information can be achieved, and the recognition precision can be improved.

An example implementation of image recognition using an image recognition solution according to the present disclosure is described below in connection with FIG. 2.

Figure 2:
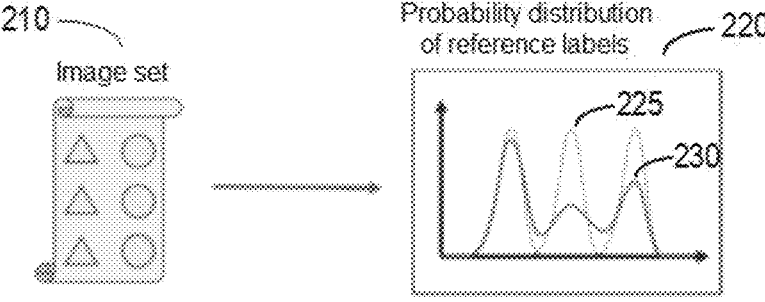
FIG. 2 illustrates a schematic diagram of distribution of generated reference label information according to an embodiment of the present disclosure.

FIG. 2 illustrates a schematic diagram of distribution of generated reference label information according to an embodiment of the present disclosure. For the sake of discussion, the example implementation will be discussed in connection with FIG. 1.

As shown in FIG. 2, image set 210 for image recognition may include two types of images, which may be three images of cats and three images of dogs. Probability distribution graph 220 of reference label information can be generated by image recognition engine 125 and based on reference images in image set 210. In probability distribution graph 220 of reference label information, dashed line 225 shows positions of three bases, and solid line 230 shows the probability distribution of the reference label information.

In the process of generating characterization information for the images, reference images with label information can be used to generate orthogonal bases for use in initial expectation information in the Gaussian mixture model. Using an EM algorithm and a simple classifier, reference label information can be generated for images without labels based on the characterization information. Then, based on a variance of the probability distribution of their reference label information, parts of images can be selected from among them to form a new training data set with images with label information, where a distribution with a low variance indicates good reference labels. Following that, using an uncertainty-aware training process, the overall model is retrained using the new training data set. In some embodiments, a fully connected layer is used as a classifier, and an output result via the classifier is a probability distribution corresponding to the reference label information for that image, an expectation for the distribution of the reference label information can be used as a final label, and its variance can be used to evaluate the uncertainty.

As can be seen from FIG. 2, the three bases have different weight information, and thus their heights are different. From probability distribution graph 220 of reference label information, it can be seen that a good classification effect can be achieved using image recognition engine 125.

FIG. 3 illustrates a flow chart of method 300 for image recognition according to some example embodiments of the present disclosure. For the sake of discussion, the example implementation will be discussed in connection with FIG. 1.

As shown in FIG. 3, at block 310, characterization information for a first reference image in a reference image set is generated in image recognition engine 125 by using a Gaussian mixture model. In some embodiments, weight information $z_{nk}{}^{new}$ for the Gaussian mixture model can be generated based on the first reference image and initial expectation information for the Gaussian mixture model, and the characterization information for the first reference image can then be generated based on the initial expectation information and the weight information z. A specific example is discussed below.

Weight information $z_{nk}{}^{new}$ can be generated using the following Equation (5):

$$z_{nk}^{new} = \frac{\kappa(x_n, \mu_k)}{\sum_{j=1}^{K} \kappa(x_n, \mu_j)} \tag{5}$$

where $\kappa$(a,b) is a kernel function that evaluates the similarity between a and b. The initial expectation information is a multi-dimensional vector, and vectors of at least two dimensions in the multi-dimensional vector are orthogonal. The initial expectation information can be acquired from weights in a network trained based on images with labels, and its specific generation process will be discussed in detail below in connection with FIG. 5. Here, the kernel function is used for generation of the weight information, and this step is an improvement to an EM process.

Thereafter, the characterization information for the first reference image is generated based on the initial expectation information and the weight information as follows:

7

$$\hat{x}_n = \sum_{k=1}^{K} Z_{nk} G(\mu, \Sigma) \qquad (6)$$

where K is the number of sub-Gaussian models (i.e., the number of bases), and $G(\mu, \Sigma)$ is the final distribution basis characterization information.

At block 320, first reference label information for the first reference image is generated based on the characterization information for the first reference image, the first reference label information being associated with a category of a first object in the first reference image. For example, M data points $\hat{x}_n$ (m) can be sampled from characterization information $\hat{x}_n$ for the first reference image. First reference label information $\hat{y}_n$ (m) is generated by classifier $f_\theta$ and based on characterization information $\hat{x}_n$ (m) for the sampling points as follows:

$$\hat{y}_n (m) = f_\theta(\hat{x}_n (m)) \qquad (7)$$

In some embodiments, classifier $f_\theta$ can be implemented as a fully connected layer, which can easily derive expectation and variance information because it is linearly transformed.

The generated first reference label information is associated with the bases, and depending on a particular implementation, one piece of reference label information can correspond to one or more bases.

At block 330, image recognition engine 125 is updated by determining the accuracy of the first reference label information for the first reference image. For example, the expectation and variance can be easily calculated based on distribution $\hat{y}_n$ (m) of label information of the sampling points. An example calculation process of a loss function in the update process (or referred to as a training process) will be discussed below.

For sampling points in a reference image set $X_L$ with label information, their loss can be expressed as a difference between an expectation value of first reference label information and pre-existing label information, as shown below:

$$\text{Loss}_L = E(\hat{y}_n) - y_n \qquad (8)$$

For sampling points in a reference image set XU without label information, their loss can be expressed based on a variance, as shown below:

$$\text{LOSS}_U = \text{VAR}(\hat{y}_n) \qquad (9)$$

Thus, the predicted total loss function for image recognition engine 125 can be expressed as:

$$L = \lambda \text{LOSS}_L + (1-\lambda)\text{VAR}(\hat{y}_n) \qquad (10)$$

where if the sampling points are from the reference image set with label information, then $\lambda = 1$, otherwise, $\lambda = 0$.

Following that, classifier $f_\theta$ can be updated using a back propagation algorithm and based on this loss function.

At the t-th iteration, matrix representation $z^{(t)}$ of $z_{nk}^{new}$ in Equation (5) can be further expressed as below:

$$z^{(t)} = \text{softmax}(\psi X(\mu^{(t-1)})^T) \qquad (11)$$

where $\psi$ is manually set to control the distribution of weight information.

Then, in step M of an EM algorithm, the expectation information can be updated based on a weighted sum of X so that they are in one space. Then, the expectation information for the t-th iteration can be represented as follows:

$$\mu_k^{(t)} = \frac{z_{nk}^{(t)} x_n}{\sum_{m=1}^{N} z_{mk}^{(t)}} \qquad (12)$$

With this process, by iterating continuously, image recognition engine 125 can be updated. Finally, after T itera-

8 tions, final bases $\mu_k(T)$, $\Sigma_k(T)$ and parameter $\theta_k(T)$ of classifier $f_\theta$ can be obtained. The first reference label information generated for each first reference image is a probability distribution, which can be represented as follows:

$$\hat{y}_n = f_\theta(\hat{x}_n) \qquad (13)$$

Since $f_\theta$ varies linearly, the distribution of $\hat{y}_n$ can be easily derived.

At this point, the update process (or training process) for image recognition engine 125 ends. The process can be summarized as shown in the following Algorithm 1:

| Algorithm 1: Training process for image recognition engine |
| --- |
| Input : $X_L$, $X_U$, $Y_L$, $f_\theta$ |
| Output : $\mu_k(T)$, $\Sigma_k(T)$, $\theta_k(T)$ |
| Initialization : $\mu_k(0)$, $\Sigma_k(0)$, $\theta(0)$ |
| for t ← 1 to T do |
|   I  Updating $z_{nk}(t)$ (Equation 5) |
|   I  Calculating $\hat{x}_n(t)$ (Equation 6) |
|   I  Calculating first reference label information $\hat{y}_n$ (Equation 7) |
|   I  Calculating loss function (Equation 10) |
|   I  Updating using back propagation $\theta(t)$ |
|   I__Updating $\mu_k(t)$ (Equation 12) |
| return |

According to the solution of the present disclosure, the EM algorithm is improved to perform basis transformation on image data features. Characterization information for data is generated by applying a neural network to the EM process and by means of basis transformation.

This characterization information is of low rank while preserving uncertainty information and reducing noise.

Figure 4A:
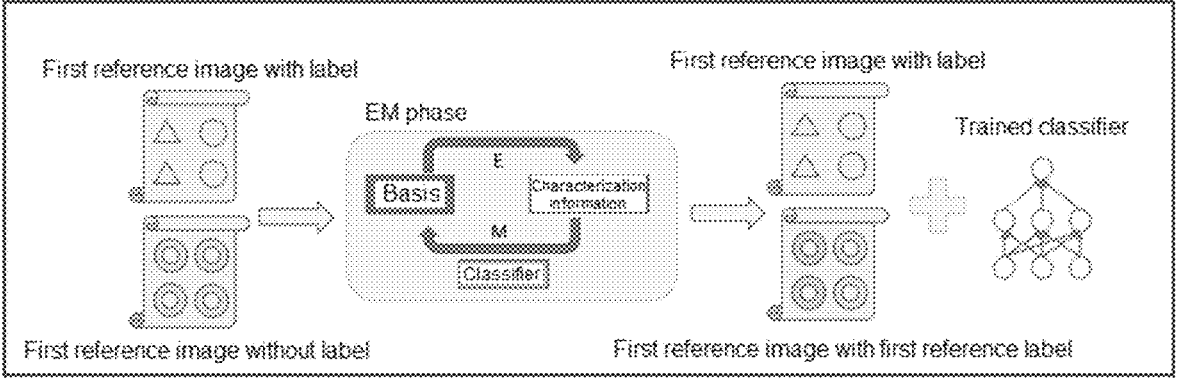
FIG. 4A illustrates a schematic diagram of a training process for an image recognition engine according to some example embodiments of the present disclosure.
Figure 4B:
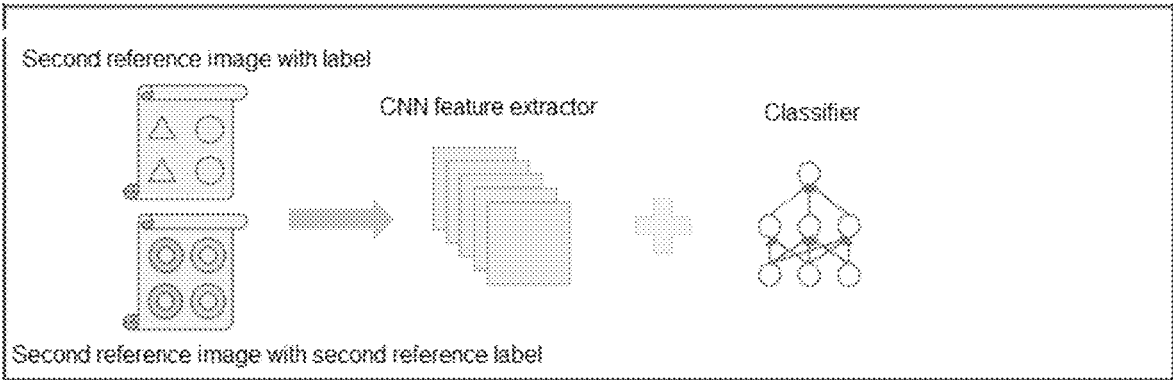
FIG. 4B illustrates a schematic diagram of a retraining process for an image recognition engine according to some embodiments of the present disclosure.

Next, an example training process of image recognition engine 125 in a self-training framework will be described in connection with FIG. 4A and FIG. 4B, wherein FIG. 4A illustrates a schematic diagram of a training process of image recognition engine 125 according to some embodiments of the present disclosure, and FIG. 4B illustrates a schematic diagram of a retraining process of image recognition engine 125 according to some embodiments of the present disclosure. For ease of discussion, the example process will be discussed in connection with FIG. 1.

In the self-training process, a model trained based on images with known label information can be used, reference label information can be generated for images without label information, and then the model can be retrained using a data set with known label information and images with reference label information. One round of training process of image recognition engine 125 and retraining process of image recognition engine 125 form a training round, and by continuously iterating these two training processes, ideal image recognition engine 125 can eventually be obtained.

In the examples shown in FIG. 4A and FIG. 4B, reference image set $\{X_L, Y_L\}$ with label information and reference image set $X_U$ without label information are given, where $X_U$ and $X_L$ belong to the same domain. As shown in FIG. 4A, when $X_L$ and $X_U$ are given, the bases and classifier are updated using the EM algorithm, and first reference label information with uncertainty information can be generated for a first reference image in $X_U$ for use in the following retraining process for updating image recognition engine 125. The classifier is also trained in this phase based on a combined loss to reduce a variance of the first reference label information generated for the first reference image in $X_U$ and to optimize the classification precision for the first reference image in $X_L$. For the specific steps of the operation, reference can be made to method 300 above, which will not be repeated here. After the training process of image recognition engine 125 shown in FIG. 4A, second reference label information can be generated for a second reference image in $X_U$. A retraining process of image recognition engine 125 will now be described in connection with FIG. 4B.

As shown in FIG. 4B, based on a second reference image without label information in the reference image set and by means of updated image recognition engine 125, second reference label information for the second reference image is generated, the second reference label information being associated with a category of an object in the second reference image. For example, the second reference image can be selected from $X_U$ based on a variance of the generated second reference label information. The selection rule is to select, from Xu, a second reference image of which its corresponding second reference label information has a low variance, and to form a retraining image set using the selected second reference image with the second reference label information in $X_U$ and the second reference image with label information in $X_L$. Based on this retraining image set (i.e., using the second reference image and the second reference label information for the second reference image), image recognition engine 125 is further updated via a CNN feature extractor. The CNN feature extractor is used to extract features (e.g., bases) of images for use in training of the classifier. The CNN may be pre-configured or may not be pre-configured, and embodiments of the present disclosure are not limited herein.

After the retraining process of image recognition engine 125 ends, one training round shown in FIG. 4A and FIG. 4B is completed. Following that, by repeating a plurality of rounds continuously, image recognition engine 125 with desirable performance can be obtained. The uncertainty in a self-learning process using a Gaussian mixture model can be well captured by this new self-learning framework.

The acquisition of initial expectation information in a GMM will now be discussed in detail in connection with FIG. 5.

Figure 5:
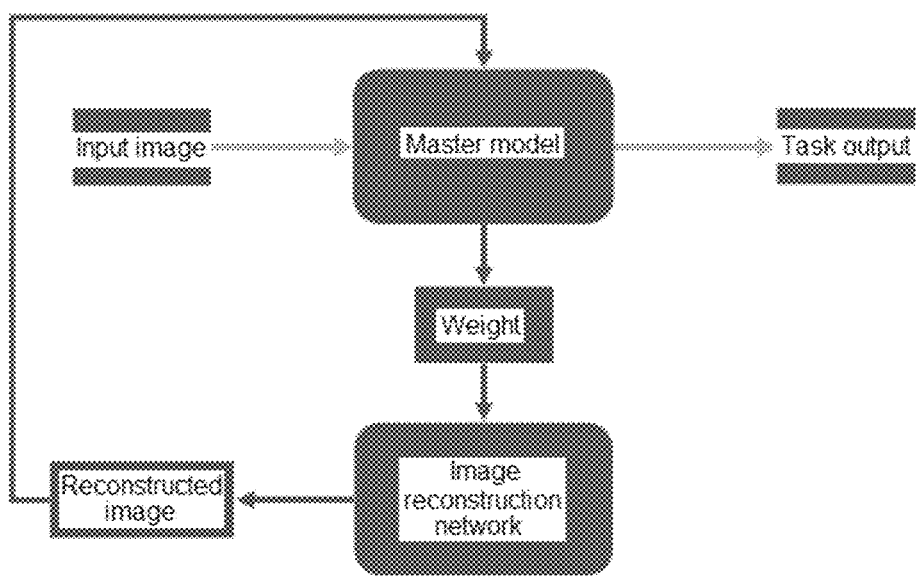
FIG. 5 illustrates a schematic diagram of a training process for a base initialization network according to some embodiments of the present disclosure.

FIG. 5 illustrates a schematic diagram of a training process for a base initialization network according to some embodiments of the present disclosure.

In order to generate a third reference label for a third reference image without a label in $X_U$, it is first necessary to determine, based on the third reference image with label information in $X_L$ and pre-existing label information for this third reference image, initial expectation information for the Gaussian mixture model for use in initialization in the EM phase, so as to accelerate the convergence of the model. That is, the bases for $X_L$ can be obtained by using a base initialization network trained based on $X_L$. These bases can be used as initial expectation information in the Gaussian mixture model in the EM phase. It should be noted that, in some embodiments of the present disclosure, the variance $E_k$ in the Gaussian mixture model can be set to a unit matrix I based on the assumption that a good basis should have a unit variance, so that the updating process for the variance $E_k$ can be ignored during the training process of the model, but embodiments of the present disclosure are not limited in this aspect, i.e., the updating process of the variance $E_k$ can also be performed.

The training process of the base initialization network as shown in FIG. 5 is divided into two main phases. The first phase is used to generate bases, while the second phase is used to fine-tune the generated bases. In the first phase, a master model is trained like in a conventional machine learning training process, and input images are processed by the master model to obtain task outputs, that is, the master model can be trained based on input images and task outputs. In some embodiments, the master model can be trained based on the third reference image with label information in the reference image set and third pre-existing label information for the third reference image, the third pre-existing label information being associated with a category of a third object in the third reference image. In some embodiments, the master model includes a feature extractor and a classifier. For example, the feature extractor can be implemented as a CNN, and this CNN may or may not be pre-trained, and embodiments of the present disclosure are not limited in this respect. For example, the classifier can be implemented as a fully connected layer, and this part is used for primitive machine learning tasks such as classification. In some embodiments, initial expectation information for the Gaussian mixture model can be obtained based on the trained master model described above. For example, during the training process, the last layer of the feature extractor can be processed to obtain weights for use as initial expectation information for the Gaussian mixture model, and the resulting weights will be used in the reconstruction process in the second phase. During the training process, the weights are orthogonalized to be used as bases. According to the above solution of the present disclosure, characterization information for an image is generated based on bases, and thus by making the bases to be orthogonal, the rank of the characterization information for the image can be reduced.

There are two tasks in the training process in the first phase, that is, classification and weight extraction. For classification, the conventional classification loss, negative log-likelihood loss (Lnl), can be used. For the weight extraction part, the weights need to be orthogonal since they are used as bases, so the loss for this part is:

$$L2=W *W^T-1 \qquad (14)$$

where W is the weight and I is the unit matrix. Thus, the loss in the first phase is:

$$L_{s1}=L_{nll}+L_2 \qquad (15)$$

Then, in the second phase, based on the weights (i.e., to be used as the initial expectation information for the Gaussian mixture model) obtained in the first phase, some random noise is input to an image reconstruction network to generate a reconstructed image. In some embodiments, this reconstruction network can be a fully connected layer. Following that, the weights (i.e., to be used as the initial expectation information for the Gaussian mixture model) can be updated based on the reconstructed image. For example, the reconstructed image can be input into a feature extractor CNN that has been well trained in the first phase, so as to reconstruct the weights. If the reconstructed image can reconstruct the weights, it can be considered that the constructed image retains most of information in the original image. Therefore, in the second phase, there is only one self-supervision loss, that is, a mean square error between the weights extracted in the first phase and the reconstructed weights in the second phase.

Based on the losses in the first and second phases, the master model can be updated iteratively. In some embodiments, weights of the last layer of the feature extractor in the trained master model can be extracted and used as the initial expectation information. In this way, orthogonal bases for $X_L$ can be obtained, and the orthogonal bases can then be used as the initial expectation information in the Gaussian mixture model.

Figure 6:
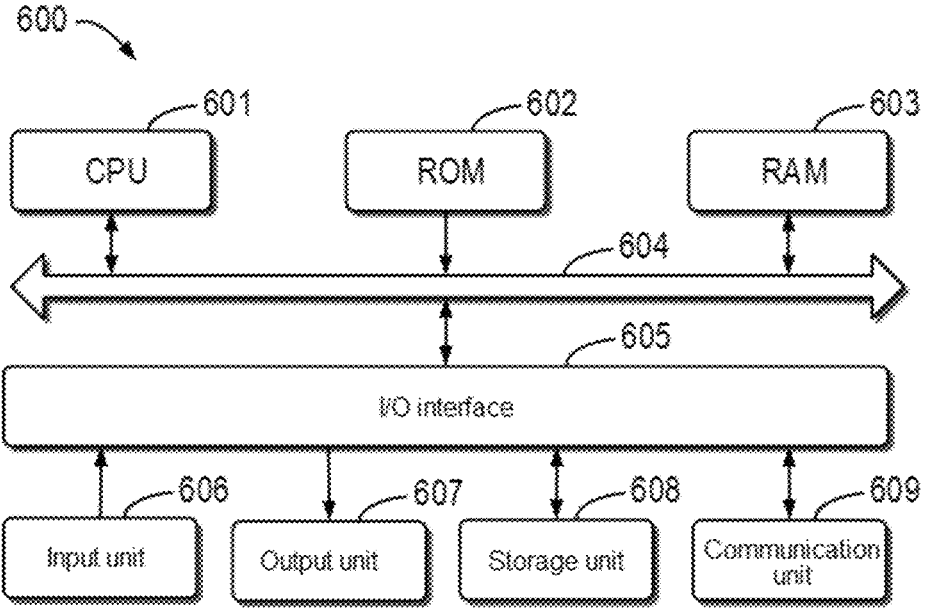
FIG. 6 illustrates a block diagram of a device suitable for implementing embodiments of the present disclosure.

FIG. 6 illustrates a schematic block diagram of device 600 that can be used to implement embodiments of the present disclosure.

As shown in FIG. 6, device 600 includes a controller or a processor or that referred to as central processing unit (CPU) 601, which may perform various appropriate actions and processes based on programs stored in read-only memory (ROM) 602 and/or random access memory (RAM) 603. ROM 602 and/or RAM 603 can store various programs and image data required for the operation of device 600. CPU 601, ROM 602, and RAM 603 are connected to each other through bus 604. In particular, device 600 also includes one or more dedicated processing units (not shown) that can also be connected to bus 604.

Input/output (I/O) interface 605 is also connected to bus 604. A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/image data with other devices via a computer network, such as the Internet, and/or various telecommunication networks. In particular, in embodiments of the present disclosure, communication unit 609 supports communication with client terminals or other devices.

In some embodiments, CPU 601 can be configured to perform the various processes and processing described above, such as method 300. For example, in some embodiments, method 300 may be implemented as a computer software program that is tangibly included in a computer-readable medium, such as storage unit 608. In some embodiments, part or all of the computer program may be loaded and/or installed onto device 600 via ROM 602 and/or communication unit 609. One or more steps of method 300 described above may be performed when the computer program is loaded into RAM 603 and executed by CPU 601. Alternatively, in other embodiments, CPU 601 may also be configured in any other suitable manner to implement the above processes/methods.

In particular, according to embodiments of the present disclosure, the processes described above with reference to FIGS. 1 through 5 may be implemented as computer program products that may be tangibly stored on a non-transitory computer-readable storage medium and include computer-executable instructions that, when executed, cause the device to implement aspects in accordance with the present disclosure.

The computer-readable storage medium may be a tangible device that can store instructions used by an instruction-executing device. For example, the computer-readable storage medium may include, but is not limited to, an electric storage device, a magnetic storage device, an optical storage device, an electromagnetic storage device, a semiconductor storage device, or any suitable combination of the foregoing. More specific, non-exhaustive examples of the computer-readable storage medium include: a portable computer disk, a hard disk, a RAM, a ROM, an erasable programmable read-only memory (EPROM or flash memory), a static random access memory (SRAM), a portable disc read-only memory (CD-ROM), a digital disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through wave-guides or other transmission media (e.g., light pulses through fiber-optic cables), or electrical signals transmitted through electrical wires.

The computer program instructions for performing the operations of the present disclosure may be assembly instructions, instruction set architecture (ISA) instructions, machine instructions, machine-related instructions, micro-code, firmware instructions, status setting image data, or source code or object code written in any combination of one or more programming languages, including object-oriented programming languages such as Java, Smalltalk, C++, etc., as well as conventional procedural programming languages such as the C language or similar programming languages. The computer-readable program instructions may be executed entirely on a user computer, or partly on a user computer, or as a stand-alone program package, or partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to block diagrams and/or flow charts of a device, a method, and a computer program product according to embodiments of the present disclosure. It should be understood that each block of the block diagrams and/or flow charts and combinations of blocks in the block diagrams and/or flow charts can be implemented by computer readable program instructions.

Various embodiments of the present disclosure have been described for illustrative purposes, but the present disclosure is not intended to be limited to those embodiments disclosed. Without departing from the substance of the present disclosure, all modifications and variations fall within the scope of protection of the present disclosure as defined by the claims.

What is claimed is:

1. A method for image recognition, including:

in a first training stage in a sequence of multiple training stages of a processor-based machine learning system:

(i) generating, in an image recognition engine implemented in the processor-based machine learning system, characterization information for a first reference image in a reference image set by using a Gaussian mixture model, wherein a plurality of weights are generated for the Gaussian mixture model as respective orthogonal bases extracted from at least one layer of at least one neural network of the image recognition engine;

(ii) generating first reference label information in the processor-based machine learning system for the first reference image based on the characterization information for the first reference image, the first reference label information being associated with a category of a first object in the first reference image; and (iii) updating the image recognition engine implemented in the processor-based machine learning system by determining the accuracy of the first reference label information for the first reference image, wherein updating the image recognition engine comprises performing an iterative optimization of the orthogonal bases in an expectation maximization feedback loop implemented by a processor of the processor-based machine learning system, the expectation maximization feedback loop comprising an expectation execution path in which one or more of the orthogonal bases are adjusted by the processor and a maximization execution path in which one or more parameters of a classifier are adjusted by the processor based on the one or more adjusted orthogonal bases, an output of the expectation execution path being coupled to an input of the maximization execution path and an output of the maximization execution path being coupled to an input of the expectation execution path, the iterative optimization repeatedly executing the expectation execution path and the maximization execution path over a plurality of iterations until a designated accuracy is reached, to obtain an updated image recognition engine; and in a second training stage following the first training stage in the sequence of multiple training stages of the processor-based machine learning system:

(i) retraining the updated image recognition engine utilizing one or more additional reference images having respective additional reference label information associated therewith;

wherein one or more additional images are classified utilizing the classifier in the retrained image recognition engine, subsequent to execution of the first and second training stages in the sequence of multiple training stages of the processor-based machine learning system.

2. The method according to claim 1, further including:

generating, in the second training stage and based on a second reference image without label information in the reference image set and by means of the updated image recognition engine, second reference label information for the second reference image, the second reference label information being associated with a category of an object in the second reference image; and using the second reference image and the second reference label information for the second reference image to further update the image recognition engine in the second training stage.

3. The method according to claim 1, wherein generating the characterization information for the first reference image includes:

generating weight information for the Gaussian mixture model based on the first reference image and initial expectation information for the Gaussian mixture model; and generating the characterization information for the first reference image based on the initial expectation information and the weight information.

4. The method according to claim 3, wherein generating the weight information for the Gaussian mixture model includes:

generating the weight information for the Gaussian mixture model using a kernel function based on the first reference image and the initial expectation information for the Gaussian mixture model.

5. The method according to claim 3, wherein the initial expectation information is a multi-dimensional vector, and vectors of at least two dimensions in the multi-dimensional vector are orthogonal.

6. The method according to claim 3, further including:

obtaining the initial expectation information for the Gaussian mixture model based on a third reference image with label information in the reference image set and third pre-existing label information for the third reference image, the third pre-existing label information being associated with a category of a third object in the third reference image.

7. The method according to claim 3, further including:

generating a reconstructed image based on the initial expectation information for the Gaussian mixture model; and updating the initial expectation information based on the reconstructed image.

8. A device for image recognition, including:

a processor, and a memory storing computer-executable instructions, wherein the computer-executable instructions, when executed by the processor, cause the device to perform actions including:

in a first training stage in a sequence of multiple training stages of a processor-based machine learning system:

(i) generating, in an image recognition engine implemented in the processor-based machine learning system, characterization information for a first reference image in a reference image set by using a Gaussian mixture model, wherein a plurality of weights are generated for the Gaussian mixture model as respective orthogonal bases extracted from at least one layer of at least one neural network of the image recognition engine;

(ii) generating first reference label information in the processor-based machine learning system for the first reference image based on the characterization information for the first reference image, the first reference label information being associated with a category of a first object in the first reference image; and (iii) updating the image recognition engine implemented in the processor-based machine learning system by determining the accuracy of the first reference label information for the first reference image, wherein updating the image recognition engine comprises performing an iterative optimization of the orthogonal bases in an expectation maximization feedback loop implemented by a processor of the processor-based machine learning system, the expectation maximization feedback loop comprising an expectation execution path in which one or more of the orthogonal bases are adjusted by the processor and a maximization execution path in which one or more parameters of a classifier are adjusted by the processor based on the one or more adjusted orthogonal bases, an output of the expectation execution path being coupled to an input of the maximization execution path and an output of the maximization execution path being coupled to an input of the expectation execution path, the iterative optimization repeatedly executing the expectation execution path and the maximization execution path over a plurality of iterations until a designated accuracy is reached, to obtain an updated image recognition engine; and in a second training stage following the first training stage in the sequence of multiple training stages of the processor-based machine learning system:

(i) retraining the updated image recognition engine utilizing one or more additional reference images having respective additional reference label information associated therewith;

wherein one or more additional images are classified utilizing the classifier in the retrained image recognition engine, subsequent to execution of the first and second training stages in the sequence of multiple training stages of the processor-based machine learning system.

9. The device according to claim 8, wherein the actions further include:

generating, in the second training stage and based on a second reference image without label information in the reference image set and by means of the updated image recognition engine, second reference label information for the second reference image, the second reference label information being associated with a category of an object in the second reference image; and using the second reference image and the second reference label information for the second reference image to further update the image recognition engine in the second training stage.

10. The device according to claim 8, wherein generating the characterization information for the first reference image includes:

generating weight information for the Gaussian mixture model based on the first reference image and initial expectation information for the Gaussian mixture model; and generating the characterization information for the first reference image based on the initial expectation information and the weight information.

11. The device according to claim 10, wherein generating the weight information for the Gaussian mixture model includes:

generating the weight information for the Gaussian mixture model using a kernel function based on the first reference image and the initial expectation information for the Gaussian mixture model.

12. The device according to claim 10, wherein the initial expectation information is a multi-dimensional vector, and vectors of at least two dimensions in the multi-dimensional vector are orthogonal.

13. The device according to claim 10, wherein the actions further include:

obtaining the initial expectation information for the Gaussian mixture model based on a third reference image with label information in the reference image set and third pre-existing label information for the third reference image, the third pre-existing label information being associated with a category of a third object in the third reference image.

14. The device according to claim 10, wherein the actions further include:

generating a reconstructed image based on the initial expectation information for the Gaussian mixture model; and updating the initial expectation information based on the reconstructed image.

15. A computer program product comprising a non-transitory computer-readable medium storing machine-executable instructions, wherein the machine-executable instructions, when executed by a machine, cause the machine to perform actions including:

in a first training stage in a sequence of multiple training stages of a processor-based machine learning system:

(i) generating, in an image recognition engine implemented in the processor-based machine learning system, characterization information for a first reference image in a reference image set by using a Gaussian mixture model, wherein a plurality of weights are generated for the Gaussian mixture model as respective orthogonal bases extracted from at least one layer of at least one neural network of the image recognition engine;

(ii) generating first reference label information in the processor-based machine learning system for the first reference image based on the characterization information for the first reference image, the first reference label information being associated with a category of a first object in the first reference image; and (iii) updating the image recognition engine implemented in the processor-based machine learning system by determining the accuracy of the first reference label information for the first reference image, wherein updating the image recognition engine comprises performing an iterative optimization of the orthogonal bases in an expectation maximization feedback loop implemented by a processor of the processor-based machine learning system, the expectation maximization feedback loop comprising an expectation execution path in which one or more of the orthogonal bases are adjusted by the processor and a maximization execution path in which one or more parameters of a classifier are adjusted by the processor based on the one or more adjusted orthogonal bases, an output of the expectation execution path being coupled to an input of the maximization execution path and an output of the maximization execution path being coupled to an input of the expectation execution path, the iterative optimization repeatedly executing the expectation execution path and the maximization execution path over a plurality of iterations until a designated accuracy is reached, to obtain an updated image recognition engine; and in a second training stage following the first training stage in the sequence of multiple training stages of the processor-based machine learning system:

(i) retraining the updated image recognition engine utilizing one or more additional reference images having respective additional reference label information associated therewith;

wherein one or more additional images are classified utilizing the classifier in the retrained image recognition engine, subsequent to execution of the first and second training stages in the sequence of multiple training stages of the processor-based machine learning system.

16. The computer program product according to claim 15, wherein the actions further include:

generating, in the second training stage and based on a second reference image without label information in the reference image set and by means of the updated image recognition engine, second reference label information for the second reference image, the second reference label information being associated with a category of an object in the second reference image; and using the second reference image and the second reference label information for the second reference image to further update the image recognition engine in the second training stage.

17. The computer program product according to claim 15, wherein generating the characterization information for the first reference image includes:

generating weight information for the Gaussian mixture model based on the first reference image and initial expectation information for the Gaussian mixture model; and generating the characterization information for the first reference image based on the initial expectation information and the weight information.

18. The computer program product according to claim 17, wherein generating the weight information for the Gaussian mixture model includes:

generating the weight information for the Gaussian mixture model using a kernel function based on the first reference image and the initial expectation information for the Gaussian mixture model.

19. The computer program product according to claim 17, wherein the initial expectation information is a multi-dimensional vector, and vectors of at least two dimensions in the multi-dimensional vector are orthogonal.

20. The computer program product according to claim 17, wherein the actions further include:

obtaining the initial expectation information for the Gaussian mixture model based on a third reference image with label information in the reference image set and third pre-existing label information for the third reference image, the third pre-existing label information being associated with a category of a third object in the third reference image.

* * * * *